Dec. 2, 1952 D. H. KING 2,620,231
LAWN SPRINKLER
Filed March 10, 1950 4 Sheets-Sheet 1

INVENTOR
D. H. KING
BY
ATTORNEY

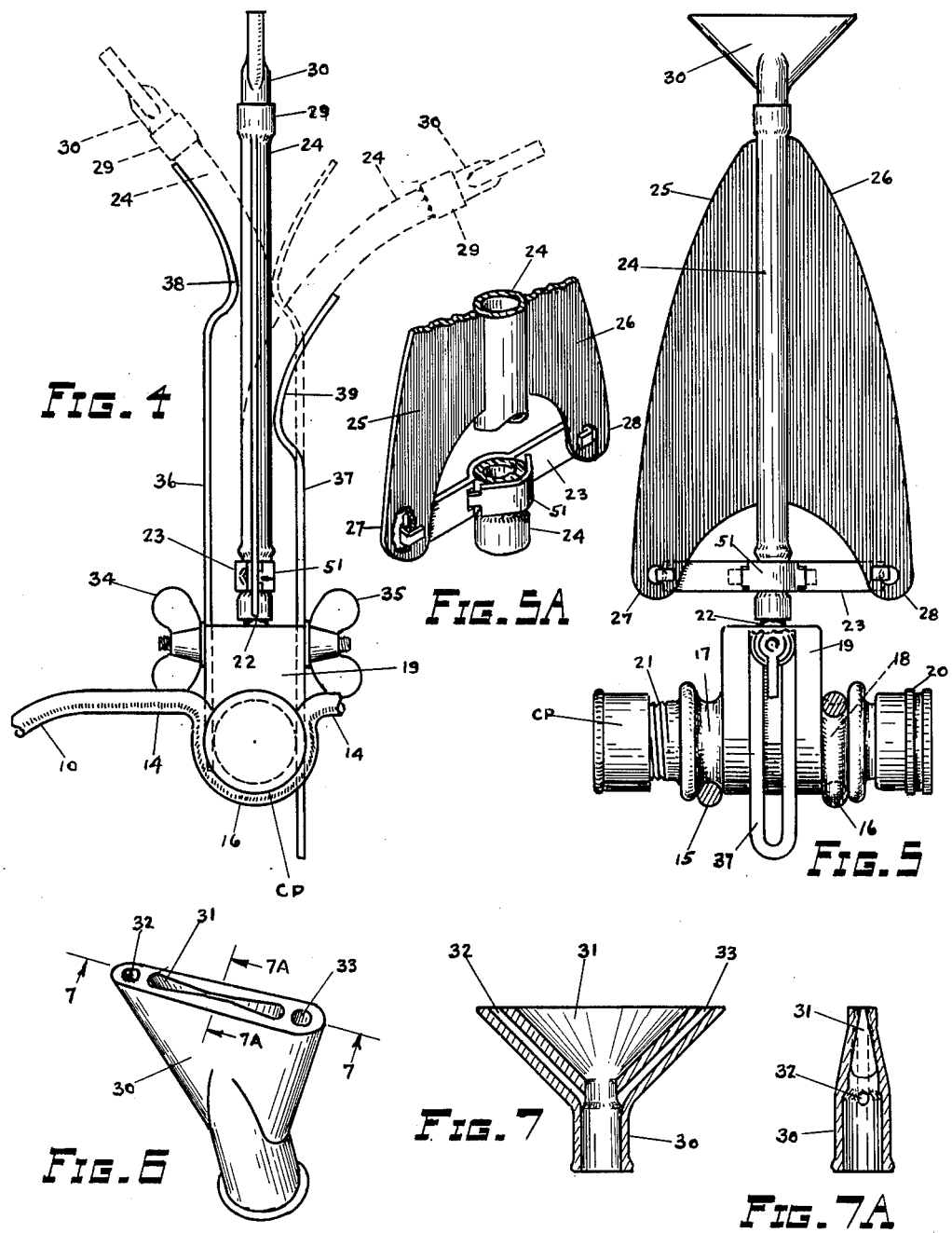

Dec. 2, 1952  D. H. KING  2,620,231
LAWN SPRINKLER
Filed March 10, 1950  4 Sheets-Sheet 3
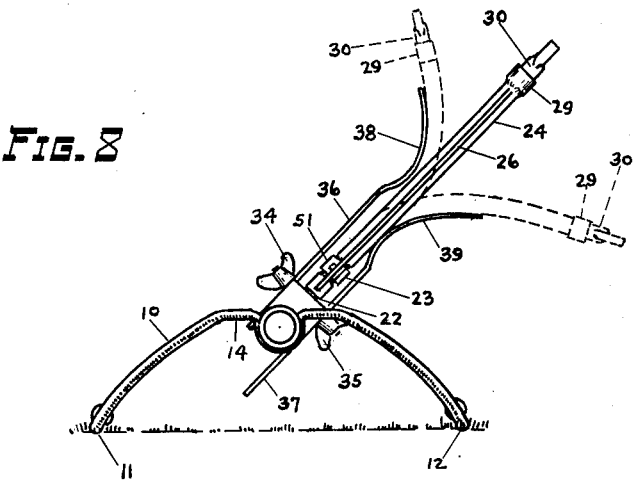
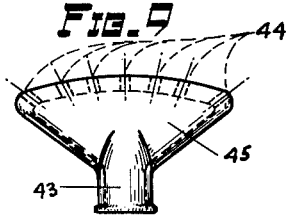
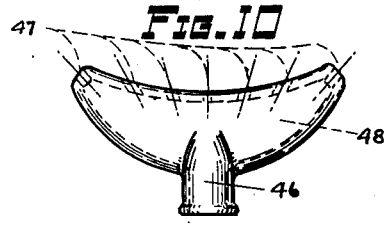
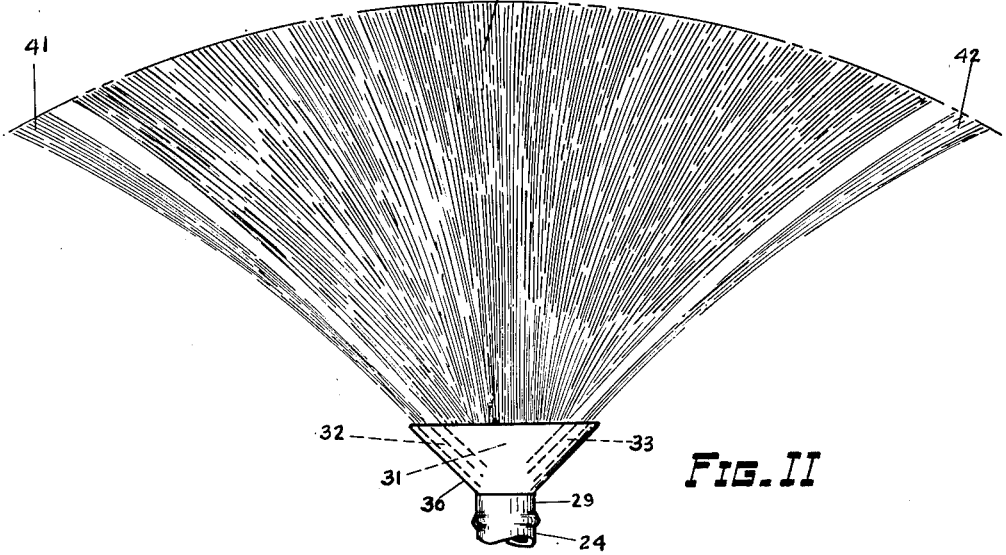
INVENTOR
D. H. KING
BY
ATTORNEY Dec. 2, 1952        D. H. KING        2,620,231
LAWN SPRINKLER Filed March 10, 1950        4 Sheets-Sheet 4

INVENTOR
D. H. KING
BY
ATTORNEY

Patented Dec. 2, 1952

2,620,231

UNITED STATES PATENT OFFICE 2,620,231

LAWN SPRINKLER

Douglas H. King, Short Hills, N. J.

Application March 10, 1950, Serial No. 148,807

3 Claims. (Cl. 299—65)

This invention relates to lawn sprinklers and more particularly to a non-rotatable sprinkler of the automatic type.

The object of the present invention is to provide a lawn sprinkler which will cover a large area with a uniform amount of precipitation.

Another object of the invention is the provision of a lawn sprinkler which will describe a substantially rectangular pattern of precipitation.

A further object of the present invention is the provision of a lawn sprinkler which is readily adjustable to cover various sizes of areas.

A still further object of the invention is the provision of a lawn sprinkler which is automatic in operation yet simple in construction and comprises a relatively few number of parts.

A still further object of the invention is the provision of a lawn sprinkler which due to its novel construction will be foolproof in operation and relatively cheap to manufacture.

A still further object of this invention resides in the provision of a lawn sprinkler which utilizes a novel and efficient type of nozzle which provides an equal distribution of precipitation.

Heretofore lawn sprinklers have resolved themselves into three general classes, i. e., the stationary fountain type, the rotating type and the oscillating type. All of these three types of sprinklers have the objection that their area of coverage is not controllable, the amount of precipitation is not uniform and in the main the automatic types are complicated in structure and costly to purchase.

The automatic sprinkler of this invention has been devised after long and careful study of the shortcomings of available sprinklers and comprises a rigid base member having adjustably mounted thereon a manifold member having an inlet and an outlet, the outlet being suitably capped when the sprinkler is to be used singly. The inlet or female connection is adapted to receive the male portion of a regulation garden hose which is connected to a suitable water supply.

Connected to the manifold, by a suitable fitting, and projecting upwardly therefrom, at substantially right angles, is a flexible tubular member which may be constructed of neoprene, rubber or any suitable tough resilient material which has the quality of retaining its properties over a long period of time. The upper or free end of the tubular member is provided with a nozzle which due to its construction, and in conjunction with the motion of the flexible tube emits a spray of water which defines a substantially rectangular pattern of precipitation and assures an even coverage of the area to be sprinkled. The upstanding tubular member has molded integral therewith, along its length and spaced 180 degrees apart, suitable fins which are bifurcated at their lower ends and are secured to a stabilizing member which in turn is secured to the fitting, which supports the tubular member, by means of a suitable clamp.

Located on each side of the tubular member and adjustably secured to the sides of the manifold, are a pair of upstanding arms which are adapted to slidably engage the sides of the tubular member to control the oscillating movement thereof.

In operation, water, under pressure, enters the manifold through the female connection and passes upwardly through the tubular member and out through the nozzle and due to the pressure and friction of the water the flexible tubular member or neck will be caused to oscillate, thereby directing the spray of water to each side of the sprinkler. By means of the adjustable arms, which bear against the tubular member, the amount of oscillation may be controlled within very narrow limits to cover either a large or small area, in any event the area covered will be substantially rectangular in configuration and will receive a uniform amount of precipitation.

Due to the novel method of securing the operating mechanism to its base, the sprinkler may be readily adjusted for use on various types of terrain.

The invention will be clearly understood from the following detailed description when read in conjunction with the following drawings of which:

Fig. 4 is an enlarged fragmentary view showing the adjustable arms for controlling the action of the nozzle and shows in dotted lines the maximum and minimum positions the nozzle will assume when so adjusted.

Fig. 5 is a side elevational view of Fig. 4 with the adjustable arms broken away.

Fig. 5A is a fragmentary perspective view, partly in section, which shows the structure and method of securing the flexible tubular member to the manifold fitting.

Fig. 6 is a perspective view of a preferred form of nozzle.

Fig. 7 is a longitudinal sectional view of the nozzle shown in Fig. 6 taken on line 7—7.

Fig. 7A is a cross sectional view of the nozzle shown in Fig. 6 taken on line 7A—7A.

Fig. 8 is a view similar to Fig. 2 and shows the sprinkler assembly adjusted to cover an unequal pattern on the ground.

Fig. 9 illustrates a modified type of nozzle having a convex configuration.

Fig. 10 illustrates a modified type of nozzle having a concave configuration.

Fig. 11 is an elevational view of the nozzle shown in Fig. 6 and shows the pattern of water discharged therefrom.

Referring now to the drawings, in which like reference numerals designate like parts.

Figure 1:
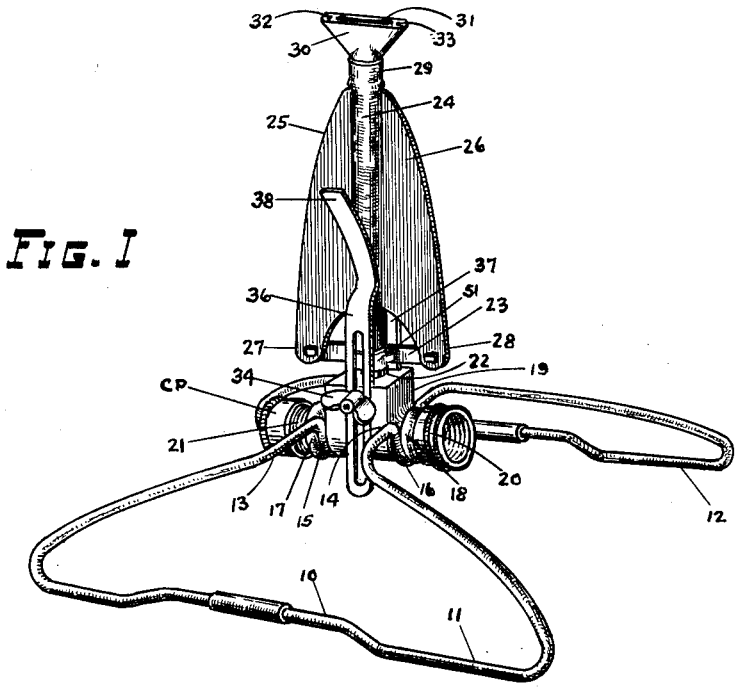
Fig. 1 is a perspective view of the sprinkler of my invention.

As shown in the various figures the sprinkler of this invention comprises a base 10, which may be formed of any suitable material, but preferably of strong heavy rod stock formed into the configuration shown, to provide a pair of runner-like members 11 and 12, along the bottom and a raised central portion comprising the parallel members 13 and 14. The members 13 and 14 are spaced apart and are provided with downwardly extending loop portions 15 and 16, which are adapted to firmly embrace the extending nipple portions 17 and 18, which extend from the manifold 19, and are provided with the female connection 20 and a male connection 21. When the sprinkler is to be used singly a cap CP may be fitted over the male connection 21, as shown.

Mounted on the upper surface of the manifold 19, is a fitting or nipple 22 which communicates with the central bore of the manifold 19 and has secured thereto, by means of a suitable clamping means 51, an upstanding flexible tubular member or neck 24. The neck 24, is preferably constructed from a tough resilient material such as neoprene, rubber, plastic or the like and extends some distance above the surface of the manifold 19, and is provided along its length, the integral extending fin portions 25 and 26, the ends of which are bifurcated and have their extremities 27 and 28 rigidly secured to the spreader arm 23, which also serves as one-half of the clamp 51 by means of which the neck of the tubular member 24 is secured to the nipple 22, as shown, to provide a unitary structure.

Fitted into the top 29, of the neck 24 is a nozzle 30, which is fan shaped in configuration and which as shown in detail, in Figs. 6, 7, 7A, and 8 is provided with a fan shaped chamber 31 and two tubular bores 32 and 33.

Adjustably secured to the sides of the manifold 19, by means of the wing nuts 34 and 35 are the upwardly extending arms 36 and 37 which are provided at their upper ends with arcuate shaped portions 38 and 39, which as shown bear against the sides of the neck 24, and may be moved upwardly or downwardly to control the effective length of the neck 24, and the consequent degree of movement thereof.

Figure 2:
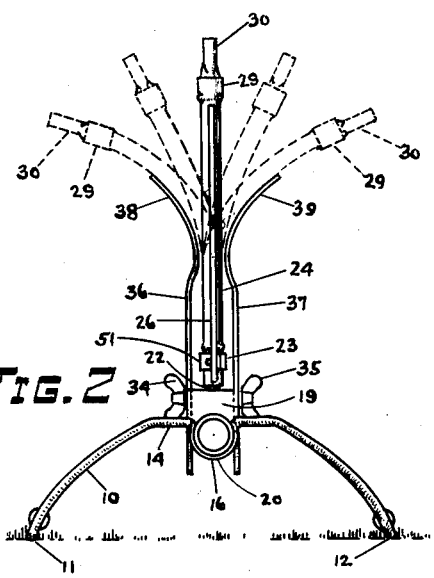
Fig. 2 is a side elevational view of the sprinkler shown in Fig. 1 and shows in dotted lines the position the nozzle assumes when it is in operation.
Figure 3:
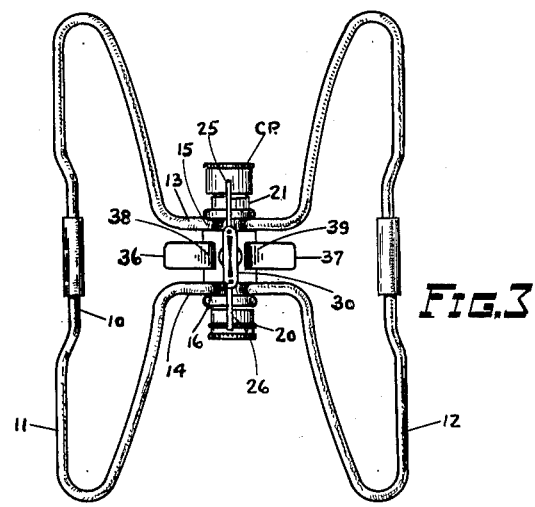
Fig. 3 is a top plan view of Fig. 2.
Figure 12:
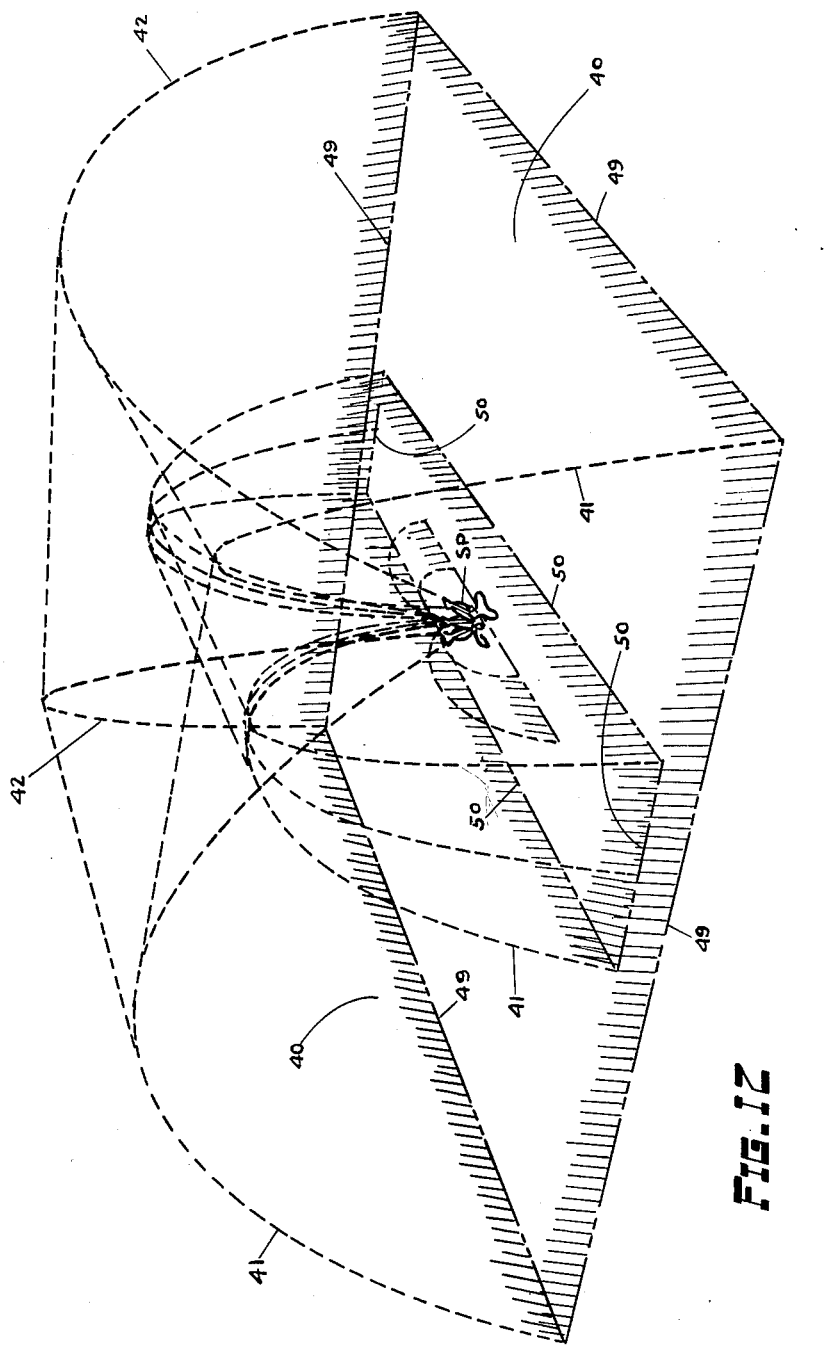
Fig. 12 illustrates diagrammatically, the various sizes of rectangles and ground coverage which may be obtained by controlling the amount of oscillation of the sprinkler nozzle.

It will be readily observed, from the foregoing description, that water under pressure entering into the manifold 19, will pass upwardly through the neck 24 and will be ejected from the nozzle 30, and due to the neck 24 being flexible the pressure and friction of the water will cause the neck to oscillate back and forth and carry with it the nozzle 30, as shown in Figs. 2 and 8 and more in detail in Fig. 12. It is therefore apparent that the lower down the arcuate portions 38 and 39 of the arms 36 and 37 are moved on the neck 24, the greater the movement thereof and the consequent greater area covered by the water emitted from the nozzle 30. By the same token, the further up on the neck 24 the arcuate portions 38 and 39 are moved the shorter the distance of travel of the neck with the consequent reduction of water coverage area.

If it is desired the arcuate portions 38 and 39, of the arms 36 and 37, may be positioned at different heights, with respect to each other, to accomplish varying degrees of coverage, as shown in Fig. 4.

In Fig. 11, there is shown in detail, the pattern of the water spray as it is emitted from the preferred form of nozzle 30 as shown in the various figures, i. e., a fan shaped spray 40, emitting from the central opening 31, and two composite streams 41 and 42, which are separate and distinct from the fan spray 40, emitted from the side bores 32 and 33, of the nozzle 30.

In the modified nozzle shown in Fig. 9, the outer surface of the nozzle 43 is convex in configuration and is provided with a plurality of apertures 44, which communicate with a central chamber 45.

The modified nozzle, shown at 46 in Fig. 10, has a concave outer surface and is provided with a plurality of apertures 47 which communicate with the central bore 48.

In the diagrammatical showing of the operation of the sprinkler of my invention in Fig. 12, indicated at SP, the lines 49, 49, 49, 49, indicate substantially the pattern obtained when the arcuate arms 36 and 37 are adjusted so as to permit the neck 24 to oscillate and travel its maximum distance, thereby covering the largest area, whereas the lines 50, 50, 50, 50, indicate the pattern obtained when the arms 36 and 37 are moved upwardly to their limit, to restrict the oscillation of the neck 24 and the consequent travel of the nozzle 30.

While I have shown and described the preferred embodiment of my invention, it is to be understood that various changes and modifications may be made therein without departing from the spirit of the invention and I am only limited by the appended claims.

What is claimed is:

1. A lawn sprinkler comprising a base, a housing mounted on said base, said housing having an inlet connection thereon, a flexible tubular member, having longitudinal fins thereon, extending from said housing and having one end communicating with said inlet connection, means on said houisng embracing said tubular member for restricting the movement thereof and a nozzle secured in the free end of said tubular member.

2. A lawn sprinkler comprising a base, a housing adjustably mounted on said base, said housing having an inlet connection thereon, a flexible tubular member, having longitudinal fins thereon, extending from said housing and having one end communicating with said inlet connection, means on said housing embracing said tubular member for restricting the movement thereof and a nozzle secured in the free end of said tubular member.

3. A lawn sprinkler comprising a base, a housing mounted on said base, said housing having an inlet connection thereon, a flexible tubular member, having longitudinal fins thereon, extending perpendicularly from said housing and having one end communicating with said inlet connection, means on said housing embracing said tubular member from opposite sides thereof, for restricting the movement thereof and a nozzle secured in the free end of said tubular member.

DOUGLAS H. KING.

REFERENCES CITED

The following references are of record in the file of this patent:

UNITED STATES PATENTS

| Number | Name | Date |
|---|---|---|
| 199,816 | Fiske | Jan. 29, 1878 |
| 1,546,714 | Buzbee | July 21, 1925 |
| 2,030,605 | Moore | Feb. 11, 1936 |
| 2,116,863 | Dinley | May 10, 1938 |
| 2,130,173 | Barnes | Sept. 13, 1938 |